United States Patent [19]
Sullivan et al.

[11] 3,832,065
[45] Aug. 27, 1974

[54] DRUM TRACK DETECTOR

[75] Inventors: Bernard J. Sullivan, Webster; David G. Baxter, Rochester, both of N.Y.

[73] Assignee: Xerox Corporation, Stamford, Conn.

[22] Filed: Mar. 23, 1973

[21] Appl. No.: 344,322

[52] U.S. Cl. .................. 356/210, 356/211, 356/237
[51] Int. Cl. ...................... G01n 21/48, G01n 21/16
[58] Field of Search .......... 355/3; 356/51, 210, 211, 356/237

[56] References Cited
UNITED STATES PATENTS

| | | | |
|---|---|---|---|
| 2,548,755 | 4/1951 | Vossberg et al. | 356/160 |
| 3,360,652 | 12/1967 | Bernous | 250/206 |
| 3,551,678 | 12/1970 | Mitchell | 356/51 |
| 3,650,617 | 3/1972 | Baxter et al. | 355/3 |

Primary Examiner—Vincent P. McGraw

[57] ABSTRACT

A method of and an apparatus for detecting a medium includes means or steps for providing a light beam and means or steps for detecting the light after it is reflected from the medium. The light providing means is positioned to direct a light beam onto a substantially planar surface at a predetermined angle of incidence. The presence of a sheet medium that may be laid on the planar surface is detected by detecting a portion of the light reflected by the sheet medium. Preferably, the detecting means is positioned so that it senses a portion of light scattered or diffused by the paper but is positioned outside of the path of the reflected light from the planar surface so that it does not detect the reflected light. In this manner, the apparatus is rendered to be capable of detecting the presence of sheet medium that diffuses the light but avoid detecting the reflected light from a planar surface. The ability to discriminate is enhanced by pulsing the light at a given repetition rate and by providing an amplifying arrangement in the photodetecting means that is tuned to the repetitive rate of the pulsed light. The discrimination capability is further enhanced by choosing a light beam that has an energy spectrum which is substantially transparent to the planar surface, i.e., is substantially absorbed by the planar surface but which is non-transparent to the sheet medium; i.e., is bounced back and diffused substantially by the sheet medium.

32 Claims, 7 Drawing Figures

DRUM TRACK DETECTOR

BACKGROUND OF THE INVENTION

This invention relates to a method of and an apparatus for detecting a presence of a medium and more particularly, an improved method of and an apparatus for detecting an unwanted continuous presence of a transfer medium still adhereing to a photosensitive insulating layer of a xerographic apparatus during its copying and duplicating process.

The formation and development of the image on a transfer medium such as a plain sheet of paper by electrostatographic process has become well known. The basic electrostatographic process by C. F. Carlson in U.S. Pat. No. 2,297,691, as practiced now involves the steps of placing a uniform electrostatic charge on a photoconductive insulating layer affixed to a conductive substrate that may be in the form of a continuous belt or cylindrical drum, imagewise exposing the layer and developing the resulting electrostatic latent image with toner particles. The developed image is then transferred to a transfer medium such as a plain sheet of paper. The transfer medium is then removed from the surface of the photoconductive insulating layer and the image made of the toner particles are heat fused onto the transfer medium. The photoconductive insulating layer is then reconditioned, that is, cleaned to wipe off residual toner particles and flood exposed to dissipate any residual charges remaining thereon, and used again in a succeeding copying operation.

In the copying process described above, various approaches have been utilized to remove the transfer medium from the photoconductive insulating layer so that copying process can be repeated. Not withstanding the efforts, no approaches used so far have been found completely fool proof, thereby necessitating the need for providing means for detecting the medium that fails to detack from the layer so that appropriate steps can be taken to remove the medium and recondition the apparatus for succeeding cycle of operation.

A detection apparatus to detect such an unwanted presence of the transfer medium still adhereing to the photosensitive insulating layer is disclosed in the copending application, Ser. No. 270,648, filed on July 11, 1972, and assigned to the same assignee as the present application. The apparatus according to the copending application shows an apparatus comprising means for projecting continuous source of light beam in the red or infrared region onto the transfer medium and photodetecting means for detecting the light reflected from the transfer medium and thereby detecting its presence. Since the photosensitive insulating layer of the xerographic apparatus of the type presently in use is substantially transparent to the light in the red or infrared region, it reflects very little amount of the light. So the photodetector does not detect anything when the transfer medium is not there. However, if the transfer medium is present and it happens to reflect the light in the red or infrared region, as is the case with ordinary white paper, then the photodetector detects the reflected light and thus indicate the presence of the transfer medium. The detected signal is then utilized to stop the copying apparatus or change its mode of operation, as described in the copending application so that suitable steps can be taken to remove undetacked transfer medium.

SUMMARY OF THE INVENTION

Therefore, it is the general object of the present invention to provide an improved method of and apparatus for detecting a medium. More specifically, it is an object of the present invention to provide an improved method of and an improved apparatus for detecting an unwanted presence of a transfer medium such as a plain paper still adhereing to the photosensitive insulating layer in the copier/duplicator apparatus.

The foregoing and other objects of the present invention are achieved by a photodetecting apparatus that provides and directs a light beam onto a plain surface of the transfer medium at a predetermined angle of incidence and that detects a portion of the light diffused by the transfer medium surface. This is implemented by using a photodetecting means positioned outside of a zone of the path of reflection of the light from the photosensitive insulating layer. The apparatus detects the presence of the sheet or transfer medium by detecting a portion of the diffused or scattered light and avoids detecting the presence of a medium that may have a planar surface such as a mirror surface which reflects the incoming beam. This phenomenon may be used advantageously to discriminate a presence of a planar surface from a non-planar or rough surface. The discrimination capability of the detecting apparatus is enhanced by pulsing the light at a given repetition rate and by providing an amplifying arrangement in the photodetecting means tuned to the repetition frequency of the pulsed light. The discrimination capability is further enhanced by selecting a light beam of an energy spectrum which is transparent to the medium having the planar surface but opaque to the sheet medium.

The foregoing and other objects and features of the present invention will be made clearer from the detailed description of an embodiment of the present invention in conjunction with the accompanying drawings, in which:

FIG. 1 shows schematically a basic electrostatographic copying apparatus in which the present detecting apparatus may be used, FIG. 2 shows an enlarged schematic view of the light applying and detecting means and their relative positions with respect to the photoconductive insulating layer and a transfer sheet medium, FIG. 3 shows a schematic block diagram of an embodiment of a detecting apparatus according to the present invention, and FIGS. 4A–4D show various wave forms helpful in explaining the operation of the detecting apparatus shown in FIG. 3.

DETAILED DESCRIPTION OF AN ILLUSTRATIVE EMBODIMENT

Figure 1:
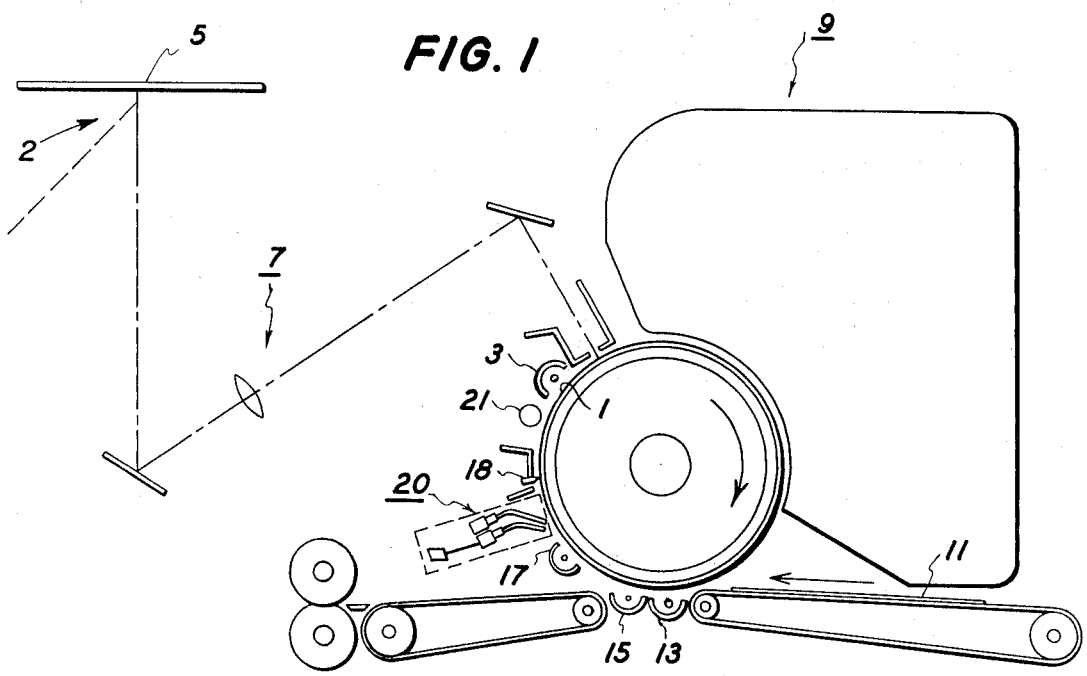

FIG. 1 shows an environment in which the present detecting apparatus can be used. Referring to FIG. 1, briefly, the copying process takes place as follows. In operation, generally, the apparatus is designed so that as the drum rotates, the photosensitive insulating layer 1 is uniformly charged by a corona generating device 3 and then the layer is imagewise exposed, that is, a light from a light source (not shown) is applied, via a path 2, to a document original 5 and reflected and a resulting optical image is applied by an optical means 7 to the layer 1. As a result a latent electrostatographic image is formed on the layer. The latent image is then developed with toner particles by cascade or other suitable means 9 such as that described in U.S. Pat. No. 2,618,552 to Edward N. Wise. The image is then transferred to a transfer medium such as a sheet of paper 11 by means of another corona generating device 13. After the image transfer, the paper is detacked from the insulating layer by a detack corona generating device 15. The photoconductive insulating layer is then cleaned by a pre-cleaning means, such as corona generating device 17 and a wiper blade 18 and flood exposed by a light source 21 so that it is ready for another cycle of copying operation.

A detecting arrangement 20 of the present invention is positioned between the pre-clean corona device 17 and the wiper blade 18 to detect the transfer medium such as the sheet of paper 11 still adhereing to the photoconductive insulating layer 1 because of the failure of the detack corona device in detacking the paper.

Figure 2:
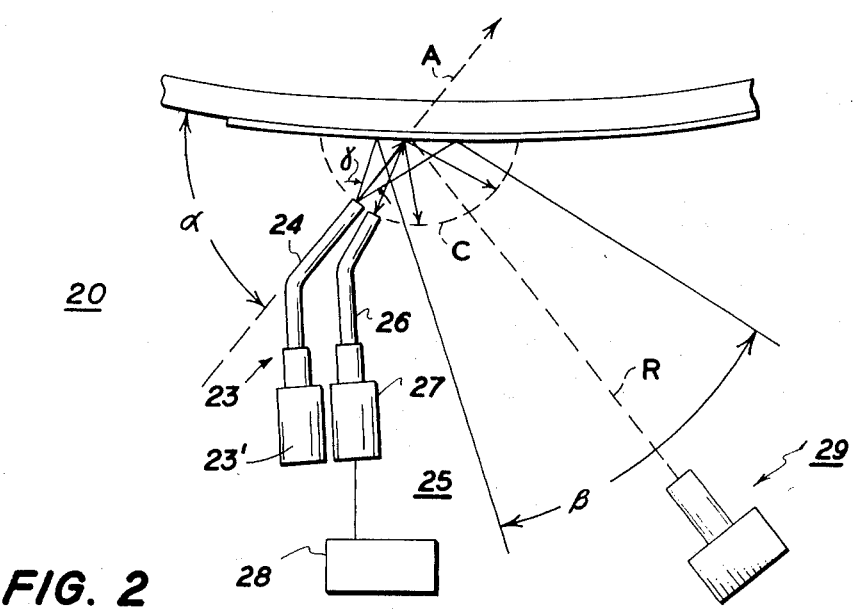

Referring to FIG. 2, the detecting apparatus generally designated as 20 according to the present invention includes means 23 of a suitable design that provides a light source 23' and a light pipe 24 for directing the light beam from the light source onto the photoconductive layer 1 of the drum or the paper 11 at a predetermined angle of incidence $\alpha$, a photodetecting means 25 which includes a light pipe 26 that guides a portion of light diffused or scattered by the paper onto a light sensing element 27 and a circuitry 28 responsive to the output of the light sensing element 27. Digressing for the moment, the photosensitive insulating layer 1 referred to here is of the type of surface that has a smooth mirror like or planar surface that reflects or absorbs but does not diffuse the incident light. Also it is found that apparently because of its sintered selenium constituent, the photosensitive insulating layer absorbs much of the light energy in the red or infrared light spectrum. The light absorbing nature is indicated schematically with a dotted line designated A in FIG. 2. There are situations where some amount of light will be reflected, however, depending upon the composition of the layer material and the light energy spectrum. This is shown schematically with a dotted line designated $\beta$ in FIG. 2. The light egressing from the light pipe 24 diverges by a certain amount 2 as schematically noted so that it spreads out by the time it reaches the photosensitive insulating layer 1. As a result, the light reflected from the photosensitive insulating layer 1 will be spread or diverged from the axis of reflection R as shown in FIG. 2, and thereby form a zone $\beta$ of area where much of the reflected light energy is concentrated. The size of the reflection zone can be readily controlled to meet a given need. Thus, for example, a coherent light beam such as a laser light beam could be used to limit the zone to an extremely narrow area. Even with ordinary light the area can be controlled by controlling the size of the light pipe diameter and the distance between the reflecting surface and the open end of the pipe 24.

It is found that ordinary bond paper which is usually used in the xerographic copier displays different optical characteristics than the photosensitive selenium layer. It is found that the paper is by and large opaque to a visible light spectrum. It reflects and scatters or diffuses the incident light in a pattern known as Lambertian distribution. This is shown schematically with a semicircle C. In accordance with an aspect of the present invention, the light pipe 26 used to guide the light to the photosensing element 27 is placed outside of the zone $\beta$ which a reflected light from a planar surface such as the photosensitive insulating layer 1 is cast so that the photodetecting means of the present apparatus substantially avoids detecting the light that reflects from the planar surface and that falls within the zone $\beta$ of reflection. By an experimental process, the applicant has found that the sensitivity of the apparatus can be optimized by using 0.063 inch (inner diameter) light pipe made of an acrylic fiber known as Crofon 1056 from DuPont placed about 0.125 inches from the layer 1. The applicant has found that the sensitivity of the apparatus can be enhanced by tilting the light pipe 24 so that the light beam forms an angle of incidence with respect to the photosensitive insulating layer of paper 11 at $57° \mp 1.5°$.

In this set up, the light pipe 26 for directing a portion of light to the photosensing element 27 was positioned in parallel with the other light pipe 24 and held next to it as shown so that its opening was more or less aligned with the opening of the other pipe. This appeared to enable the pipe 26 to get a good amount of diffused light from the paper 11 while avoiding the reflected light from the layer 1.

In view of the foregoing, the detecting apparatus described above can be used to detect the presence of any medium having a relatively plain surface that diffuses or scatters and while at the same time avoid detecting a presence of a planar surface that reflects but does not diffuse or scatter the incident light. Thus, the present detecting apparatus can be utilized advantageously to discriminate the presence of a plain sheet material such as an ordinary bond paper that diffuses or scatters and spreads the incident light in a Lambertion distribution from a sheet material having a smooth planar surface that reflects the incident light According to a further aspect of the present invention, the detecting and discrimination capability of the present invention, is further enhanced by utilizing a pulsed light source and means for tuning the detecting means to the particular repetition rate of the pulsed light. This is especially advantageous in the situation where there may be present stray lights which may falsely trigger the photodetecting means, absent suitable means for guarding against this form happening. The tuning means nullifies or reduces the adverse effect of stray light from the light or other sources upon the noise signals, i.e. operation of the detector in that they decrease the sensitivity of the detecting means. This is made possible according to the present invention by using a pulsed light source and photodetecting means with tuned amplifier. Thus, referring to FIGS. 3 and 4, respectively, the detecting apparatus according to an aspect of the present invention is provided with any suitable means 30 for generating a train of light pulses which may include an oscillator 32 and a light emitting device 33. The oscillator 32 is of a design that will cause the light emitting means 33 to emit the train of light pulses of a given repetition rate. For the oscillator, one may use any one of a suitable conventional oscillator such as an operational amplifier or a multivibrator.

Figure 4A:
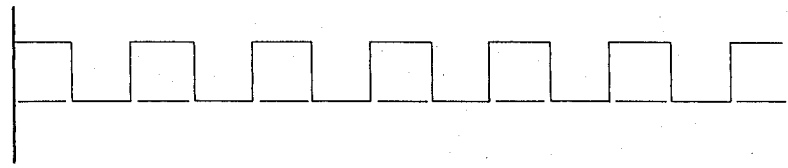

For the light emitting means, a generally known element such as a light emitting diode (LED) which emits a light in the red region of the light spectrum may be used. The LED is driven by the oscillator so that it generates a train of light pulses, as illustrated in FIG. 4A.

The detecting means 31 comprises a light sensing means 35 which may be made of a conventional device, such as a cadmium sulfide photocell and a preamplifier 37 which amplifies the output of the photocell 35. As shown by the wave form of FIG. 4A the train of light pulses produced by the light emitting means may be in the form of a rectangular wave. Cadmium photocell will change its resistance in response to the light pulses. However, the change is gradual enough so that there is some slight time delay in its response. Because of this, the cadmium sulfide photocell 35 may produce a delayed output wave such as that shown in FIG. 4B, instead of a square wave.

Figure 4B:
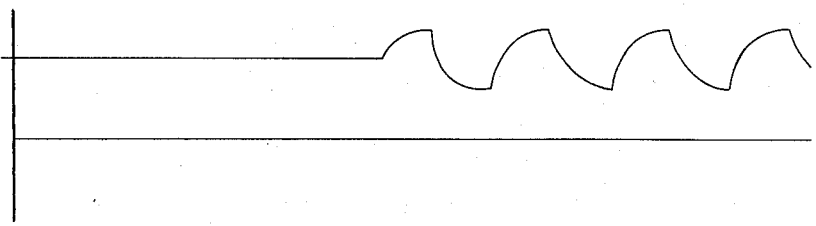
Figure 4C:
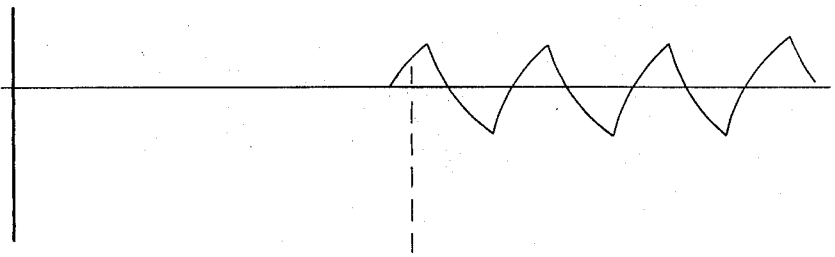

The voltage across the cell varies in a sinusoidal fashion with reference to its DC bias voltage as shown by FIG. 4B. The DC portion may be removed in a well known manner and the AC portion is then amplified to a suitable magnitude by the preamplifier 37, as shown in FIG. 4C.

Accordingly, another aspect of the present invention is the photodetecting means provided with bandpass filter 38 tunes to the frequency of the repetition rate of the train of light pulses from the light source 33. As well known, the bandpass filter attenuates signals outside of the tuned frequency which may have come from stray light or external electrical noise such as sparks or harmonics of the AC power source. By trail and error process, it was found that use of 1,000 Hz. pulsed light and a tuned amplifier to detect the 1,000 Hz. signal provided a good discrimination against ambient noise.

Figure 4D:
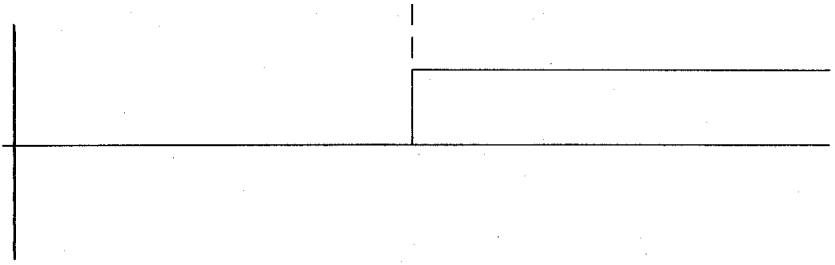

The detecting means 31 may also include a peak detector circuit 39 which detects the peaks of the amplified and bandpass filtered signal and produce a DC signal as shown in FIG. 4D. The output of the peak detector 39 is subsequently utilized in a suitable manner such as, for example, in stopping the electrostatographic copying apparatus or changing its mode of operation, as described in detail in the copending application, so that necessary steps may be taken to remove the unwanted transfer medium, e.g., paper sheet, still adhereing to the photosensitive insulating layer.

While FIG. 4A shows that the light source is in the form of square wave train, its wave form need not be limited to a square wave. It could be in the form of a train of rectangular waves of suitable pulse width or of sinusoidal wave train. Thus, the expression 'pulse train' used in this application is intended to cover pulses of various suitable shapes having on and off cycles at a given repetition rate.

The use of pulsed light and a bandpass filter substantially enhances the sensitivity discrimination capability and reliability of the detecting apparatus. It seems that these means nullify adverse effects that the thermal drift and the DC drift of certain of the circuit elements such as the cadmium sulfide photocell have on the sensitivity of the photodetector. The apparatus according to the present invention is also found less susceptible to the adverse effect of the toner particles or dust which may settle on the light emitting and photodetecting means and thereby reduce the light transmission efficiency from the light source to the photosensing element 35. Thus, the reduced transmission caused by the particles or dust decreases the difference between the presence and absence of diffused light coming from the transfer medium as detected by the photocell. This may be further reduced by the thermal or DC drifts characteristic of certain elements as described above. In this situation, a DC photodetecting means will likely fail to detect and discriminate. However, AC form of detecting apparatus of the present invention, much of these problems are avoided in that they discriminate an AC signal of a particular frequency from ambient noise signals which fall by and large outside of the tuned frequency and avoid the DC and thermal drift problems entirely.

Figure 3:
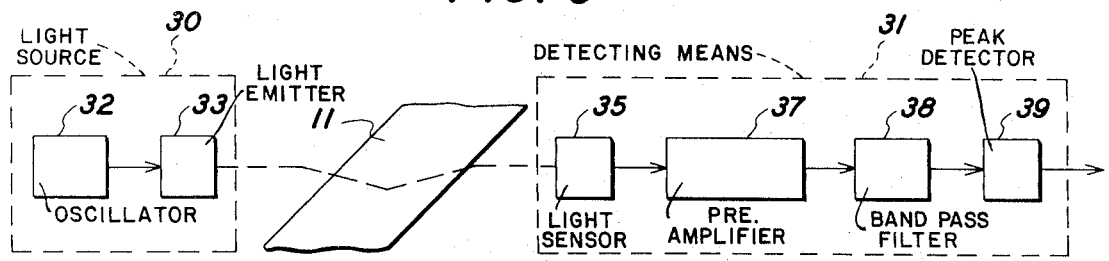

The enhanced sensitivity and discrimination capability provided by the pulsed light source and use of tuned amplifying arrangement described above in conjunction with the embodiment shown in FIG. 3 can be enhanced further by incorporating certain of the features of the detection apparatus described in conjunction with the embodiment shown in FIG. 2. Thus, for example, the light from the light emitting means 33 may be connected to a first light pipe 24 and another light pipe may be connected to direct the diffused light in the way the two light pipes 24 and 26 are used by the apparatus shown in FIG. 2. These additional changes may be made especially where the sensitivity and discrimination capability is critical.

Various other modifications and changes may be made to the embodiment of the present invention as described herein above without departing from the spirit and the scope of the present invention. For example, an additional photodetecting means 29 in FIG. 2 of the type described above may be positioned in the path of the reflected light to make positive identification of the presence of the planar surface.

What is claimed is:

1. In an electrostatographic reproducing apparatus having a photosensitive plate which is charged, imagewise exposed and developed to form an image of an original which is then transferred to a transfer medium such as a copy sheet of paper brought in contact with the layer, wherein said photosensitive plate is of the type that absorbs substantially all of the light applied thereto during the imagewise exposure and said transfer medium is of the type that reflects the light, an apparatus for detecting the continued presence of the transfer medium, comprising:
    means for applying a train of light pulses of a predetermined frequency against said plate, and photodetecting means tuned to detect the presence of a train of light pulses of the predetermined frequency reflected from said transfer medium, whereby said photodetecting means is rendered noise immune.

2. The apparatus according to claim 1, wherein the repetition rate of the train of light pulses is selected at a particular frequency substantially above the frequency of the AC power supply to the reproducing apparatus.

3. The apparatus according to claim 2, wherein said photodetecting means includes a bandpass filter tuned to said particular frequency.

4. The apparatus according to claim 3, wherein said photodetecting means includes a peak detector for producing a DC output from the output of said bandpass filter.

5. The apparatus according to claim 4, including a preamplifier for amplifying detected signal before it is applied to said filter.

6. The apparatus according to claim 1, the light is pulsed at a frequency above the frequency of stray light generally encountered.

7. A detecting apparatus for detecting a presence of a medium having a plane surface which reflects and diffuses or scatters the reflected light, comprising:
means for applying a light beam to said surface at a predetermined angle of incidence, and
a photodetecting means positioned at a location outside of a zone of an area where a reflected light would be cast if said surface is planar, for detecting the presence of said medium.

8. The apparatus according to claim 7, wherein said medium is a sheet member such as a copy sheet which is supported by a substrate medium having a planar surface and is of a type that reflects an incident light.

9. The apparatus according to claim 8,
second photodetecting means positioned within the zone of reflection for detecting the light reflected from the surface of said substrate.

10. The apparatus according to claim 9, wherein said light applying means is adapted to apply a coherent light beam.

11. The apparatus according to claim 9,
said means for applying the light beam includes a first light pipe aligned to direct the light beam at said predetermined angle, and
said photodetecting means includes a second light pipe positioned outside of said zone of reflection for guiding a portion of the diffused or scattered light and a photocell for sensing the light from said second light pipe.

12. The apparatus according to claim 11, wherein said first light pipe is positioned so that said predetermined angle of incidence is $57° \mp 1.5°$.

13. The apparatus according to claim 12,
said means for providing the light beam includes means for pulsing the light at a predetermined repetition rate, and said photodetecting means includes a bandpass filter tuned to said repetition rate for filtering out noise signals from the detected light.

14. An apparatus for detecting and discriminating the presence of a first member having first surface which reflects an incident light and diffuses or scatters the reflected light from a second member having a planar surface which is disposable in parallel with said first surface and which absorbs or reflects an incident light, but does not diffuse or scatter the incident light, comprising:
means for applying a light beam at a predetermined angle of incidence onto a surface of a member, and first photodetecting means positioned outside of a zone of reflection for detecting the presence of diffused or scattered light and thereby determining the presence of said first member.

15. The apparatus according to claim 14, wherein said means for applying the light beam includes an oscillator for generating an output pulse train at a repetition rate substantially above 60 Hz and a light emitting diode for generating a train of light pulses in response to the output of said oscillator and said photodetecting means includes an amplifier tuned to receive the detected light having said repetition rate.

16. The apparatus according to claim 15, including a peak detecting means for rectifying the output of said tuned amplifier.

17. The apparatus according to claim 16, wherein the angle of incidence of the light beam is $57° \mp 1.5°$ with respect to the plane of said second planar surface.

18. The apparatus according to claim 14, including a second photodetecting means positioned in the path of the reflected light to detect the reflected light from said planar surface and thereby detect the presence of said second member having a planar reflecting surface.

19. In an electrostatographic reproducing apparatus having a photosensitive plate having a planar surface, said plate being partially transparent and partially reflective,
means for charging the plate,
means for exposing the plate to light to form a latent electrostatic image of a document original,
means for developing the image,
means for laying a copy sheet on said plate, said sheet being of substantially reflective character that reflects and scatters or diffuses the incident light,
means for transferring the image to said copy sheet, and
means for removing the copy sheet from said plate, the improvement which comprises an apparatus for detecting the failure of said removing means to remove the copy sheet, said apparatus comprising:
means for applying a light at a predetermined angle of incidence to the surface of said plate, and
photodetecting means positioned outside of the zone where the light reflected from said plate would fall, for detecting the reflected and scattered or diffused light from the copy sheet and thereby detecting the failure of said removing means to remove the copy sheet from said plate.

20. The apparatus according to claim 19, wherein said means for applying a light beam includes means for modulating the light beam so that a train of light pulses of a predetermined repetition rate is applied to the surfaces of said plate of copy sheet.

21. The apparatus according to claim 20, wherein said photodetecting means includes means for sensing a light beam in the form of a train of pulses reflected and scattered or diffused from said copy sheet.

22. The apparatus according to claim 21, wherein the repetition rate of the train of light pulses is set at a level substantially above the frequency of the AC power supply for the reproducing apparatus.

23. The apparatus according to claim 21, wherein said photodetecting means includes means adapted to detect light from the copy sheet includes
a bandpass filter tuned to said predetermined repetition rate.

24. The apparatus according to claim 23, including a peak detector for converting the AC output of said bandpass filter to provide a DC output.

25. The apparatus according to claim 19, including a second photodetecting means placed within the zone of reflection for detecting the light reflected from the photosensitive plate.

26. The apparatus according to claim 20, said means for applying a light is adapted to apply a focused light beam.

27. The apparatus according to claim 19, said means for applying a light beam is a laser light source.

28. The apparatus according to claim 27, wherein said light beam applying means includes means for modulating the light beam so that a train of light of a predetermined frequency is applied to the surface of said plate.

29. A method of detecting presence of a medium that reflects an incident light, comprising the steps of:
- applying onto said medium a light beam pulsed at a predetermined repetition rate,
- photoelectrically detecting the light reflected from said medium,
- generating a train of electrical signal pulses representing the detected light, and
- filtering said train of electrical signal pulses to tune out noise signals therefrom, whereby the method is rendered noise immune.

30. The method according to claim 29, wherein said method is adapted for detecting a substrate member having a planar reflecting surface that reflects incident light and wherein said medium being detected is a nonplanar sheet member that may be placed on said substrate member and that scatters or diffuses the incident light, including the step of;
- directing the incident light beam at a predetermined angle of incidence;
- and positioning photoelectrically detecting means at an angle of reflection within the zone of reflection for detecting the presence of said substrate member.

31. The method according to claim 30, including the step of positioning a photodetecting means outside of the zone of reflection for detecting the scattered or diffused light thereby detecting the presence of the sheet member on said substrate member.

32. The method according to claim 30 including the steps of directing the incident light beam at an angle of about 57°.

* * * * *